United States Patent [19]

Takahashi et al.

[11] Patent Number: 5,621,462
[45] Date of Patent: Apr. 15, 1997

[54] IMAGE PICKUP DEVICE CAPABLE OF CONTROLLING MADE PICKUP OPERATION

[75] Inventors: Koji Takahashi; Kenji Kyuma; Kyoji Tamura, all of Yokohama; Yuji Tsuda, Musashino, all of Japan

[73] Assignee: Canon Kabushiki Kaisha, Tokyo, Japan

[21] Appl. No.: 311,207

[22] Filed: Sep. 23, 1994

Related U.S. Application Data

[63] Continuation of Ser. No. 931,820, Aug. 18, 1992, abandoned.

[51] Int. Cl.$^6$ ................................................. H04N 5/238
[52] U.S. Cl. ........................ 348/363; 348/229; 354/410
[58] Field of Search ................................. 348/229, 362, 348/363, 296, 297; 354/460, 410, 412, 400; H04N 5/238

[56] References Cited

U.S. PATENT DOCUMENTS

| | | | |
|---|---|---|---|
| 3,555,181 | 1/1971 | Thomman | 348/229 |
| 4,739,411 | 4/1988 | Bolton | 318/227 |
| 4,868,667 | 9/1989 | Tani et al. | 358/228 |
| 4,884,144 | 11/1989 | Jinnai et al. | 358/228 |
| 4,910,600 | 3/1990 | Kondo | 358/228 |
| 5,036,400 | 7/1991 | Haruki | 358/228 |
| 5,040,072 | 8/1991 | Tsuji et al. | 358/228 |
| 5,184,172 | 2/1993 | Miyazaki | 354/432 |
| 5,258,848 | 11/1993 | Kondo et al. | 348/229 |

*Primary Examiner*—Leo Boudreau
*Assistant Examiner*—Bipin Shalwala
*Attorney, Agent, or Firm*—Robin, Blecker, Daley & Driscoll

[57] ABSTRACT

In an image pickup device capable of effecting the exposure control with plural control parameters such as the iris aperture, shutter speed and gain, the set range of the control parameters is divided into plural areas according to the phototaking condition, and the exposure control information is operated by varying one of the plural control parameters while fixing other control parameters in each of the plural divided areas. Thus optimum exposure control is rendered always possible according to the phototaking situation or condition. Also since the variable parameter is selected according to the phototaking situation, the magnitude of calculation required in the control circuit does not increase in each situation, and compact and rapid control can be realized.

18 Claims, 10 Drawing Sheets

FIG. 6

| 01 | 02 | 03 | 04 | 05 | 06 |
| --- | --- | --- | --- | --- | --- |
| 07 | 08 | 09 | 10 | 11 | 12 |
| 13 | 14 | 15 | 16 | 17 | 18 |
| 19 | 20 | 21 | 22 | 23 | 24 |

FIG. 7

| 0.5 | 0.5 | 0.5 | 0.5 | 0.5 | 0.5 |
| --- | --- | --- | --- | --- | --- |
| 0.5 | 1.0 | 1.0 | 1.0 | 1.0 | 0.5 |
| 0.5 | 1.0 | 1.0 | 1.0 | 1.0 | 0.5 |
| 0.5 | 0.5 | 0.5 | 0.5 | 0.5 | 0.5 |

FIG. 8

| 0.0 | 0.0 | 0.0 | 0.0 | 0.0 | 0.0 |
| --- | --- | --- | --- | --- | --- |
| 0.5 | 0.5 | 0.5 | 0.5 | 0.5 | 0.5 |
| 1.0 | 1.0 | 1.0 | 1.0 | 1.0 | 1.0 |
| 1.0 | 1.0 | 1.0 | 1.0 | 1.0 | 1.0 |

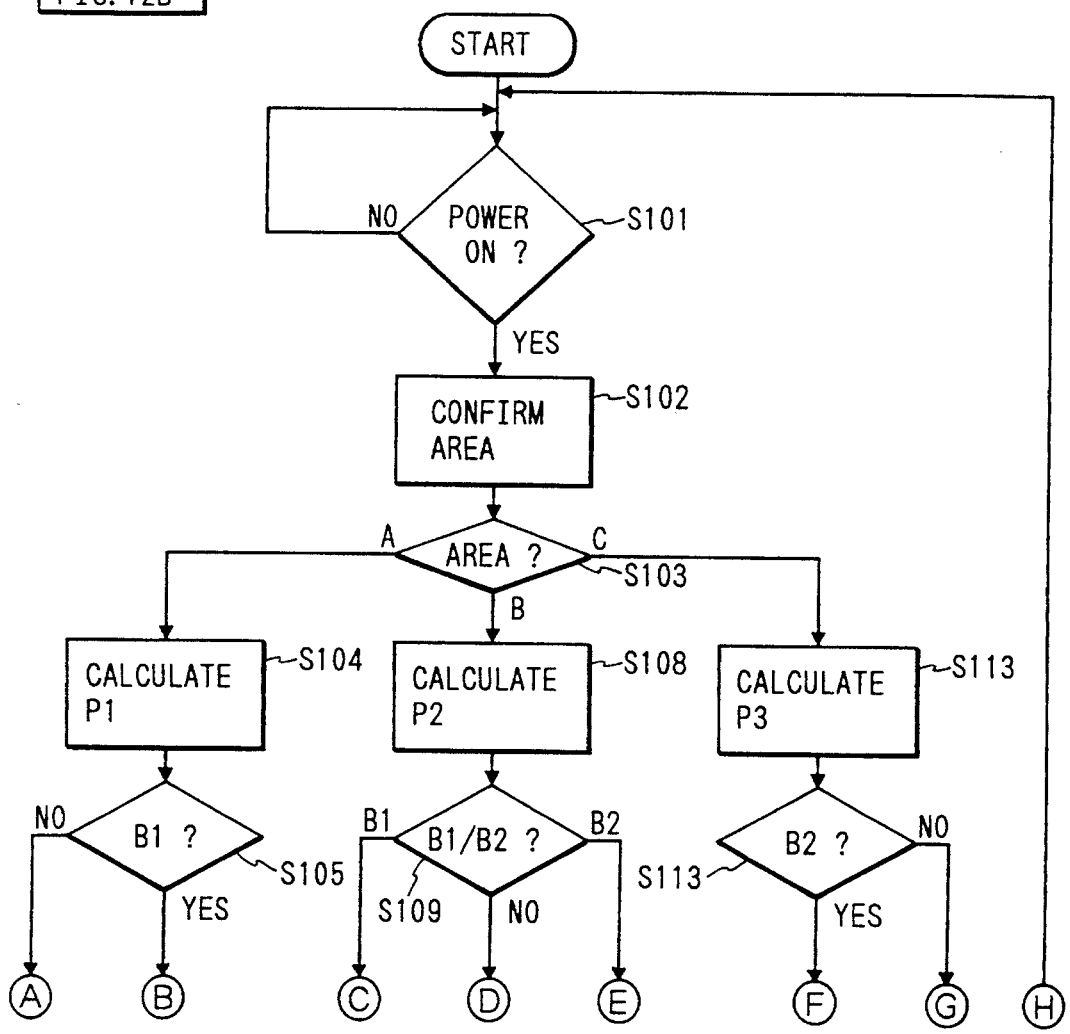

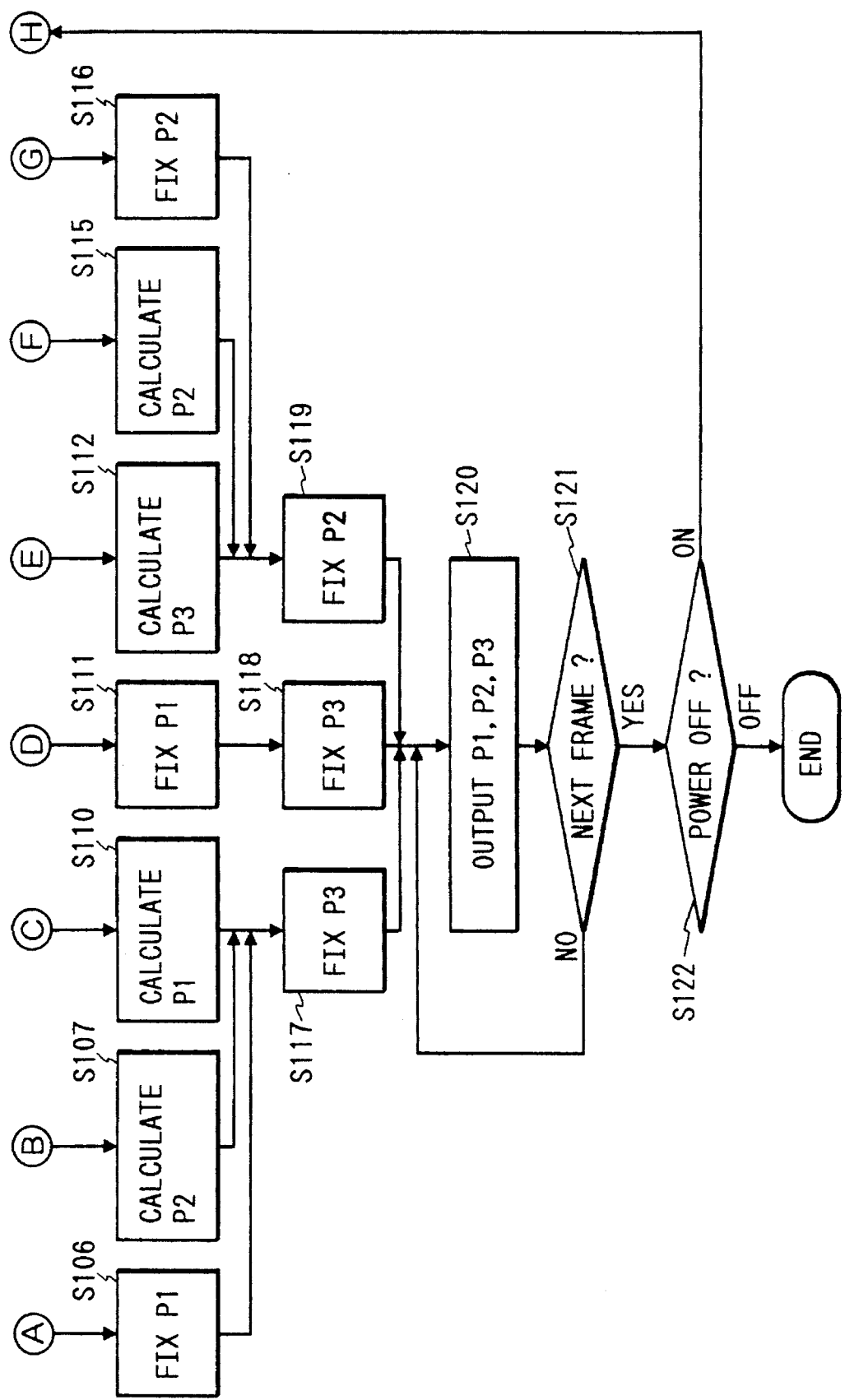

IMAGE PICKUP DEVICE CAPABLE OF CONTROLLING MADE PICKUP OPERATION

This is a continuation application under 37 CFR 1.62 or prior application Ser. No. 07/931,820, filed Aug. 18, 1992 now abandoned.

BACKGROUND OF THE INVENTION

1. Field of the Invention

The present invention relates to an image pickup device adapted for use in a video camera or the like.

2. Related Background Art

Recent remarkable progress in imaging equipment such as video cameras has realized automation of various functions and improvement in operability, such as incorporation of zoom lens, automatic focusing and automatic exposure control. For example, the automatic exposure control is an extremely important factor governing the quality of the obtained image, and has to always function stably and satisfactorily in any phototaking condition.

FIG. 1 is a block diagram showing a basic configuration of the exposure control system of an ordinary video camera, wherein provided are a phototaking lens optical system 101; an iris (diaphragm) 102 for regulating the amount of incident light; a photosensor device 103 such as a CCD, for effecting photoelectric conversion on an image, which is focused by the phototaking optical system on a phototaking face of said device and is regulated in the light amount by the iris, into an image signal; a camera signal processing circuit 104 for applying a predetermined signal processing to the image signal released from said photosensor device thereby obtaining a standardized image signal; an image signal output terminal 105; a motor 106 for driving the iris 102 for varying the aperture thereof; an iris driving circuit 107 for controlling the motor 106; a CCD drive circuit 108 for controlling the timing of accumulation, signal readout and resetting of the photosensor device 103 and varying the accumulation time (exposure time) of said device thereby obtaining a desired shutter speed; an automatic exposure control (AE) circuit 109 for evaluating the exposure state, based on the luminance signal from the camera signal processing circuit, and obtaining an optimum exposure by controlling the iris drive circuit 107 and the CCD drive circuit 108; and a switch panel 110 for entering key operations.

The exposure control by the AE circuit 109 is conducted in the following manner. There is formed an iris controlling closed loop, for integrating the luminance signal from the signal processing circuit 104, controlling the iris driving circuit 107 so as to maintain the level of said signal within a predetermined range and controlling the drive current to the iris motor for varying the aperture of the iris, and there is provided a control system for controlling the CCD drive circuit 108 to switch the driving pulses thereof in response to the key operation on the switch panel 110, thereby varying the accumulation time of the image pickup device 103 to control the exposure time and to obtain an appropriate exposure. Said accumulation time control is called electronic shutter, and can select several stages from $1/100$ sec. to $1/10000$ sec., in addition to the ordinary exposure time of $1/60$ sec. for NTSC standard.

When a high-speed electronic shutter is used in such system, there is assumed so-called shutter priority mode in which the iris is controlled according to an arbitrarily selected shutter speed. FIG. 2 shows said shutter priority mode, in which the shutter speed in the abscissa is at first fixed, and the aperture value in the ordinate is varied accordingly.

However, the above-explained iris control in the shutter priority mode according to the luminance level of the image signal as in the foregoing video camera is unable to provide appropriate exposure control under various phototaking conditions.

In a camera for still image taking, such as a conventional still camera utilizing a silver halide film, the exposure control needs to be appropriate only at the moment of phototaking, but, in case of recording the moving image for a long time as in the video camera, the exposure control has to be conducted in constantly stable and optimum manner, following the continuously varying conditions in the course of phototaking operation, and an exposure control device for video camera, meeting these requirements, has been longed for.

SUMMARY OF THE INVENTION

In consideration of the foregoing, a first object of the present invention is to provide an image pickup device always capable of optimum exposure control, regardless of the situation or condition of phototaking.

A second object of the present invention is to provide an image pickup device, adapted for use in a camera for taking moving image such as a video camera and capable of exposure control which can follow the phototaking situation in natural manner.

A third object of the present invention is to provide an exposure control device capable of controlling, in optimum manner, plural parameters for exposure control in an efficient and simple algorithm.

A fourth object of the present invention is to provide an image pickup device enabling the exposure control to follow the phototaking situation on real-time basis with the lapse of time, which has not been achievable in the exposure control in the conventional photographic still camera.

The above-mentioned objects can be attained, according to a preferred embodiment of the present invention, by an image pickup device capable of controlling the phototaking operation with plural control parameters, comprising operation means for dividing the set area for said control parameters into plural areas and operating control information by varying one of said plural control parameters and fixing other control parameters in each of said divided areas, and control means for controlling said phototaking operation based on the result of calculation by the operation means.

Also according to a preferred embodiment of the present invention, there is disclosed a control method for an image pickup device capable of controlling the phototaking operation with plural control parameters, comprising steps of dividing the set area of said control parameters into plural areas, operating control information by varying one of said plural control parameters and fixing other control parameters in each of said divided areas, and controlling said phototaking operation based on the result of the operation.

Also according to a preferred embodiment of the present invention, there is disclosed an image pickup device capable of controlling the phototaking operation with plural control parameters, comprising operation means for dividing the set area for said control parameters into plural areas and operating control information by varying one of said plural control parameters and fixing other control parameters in each of said divided areas, and control means for controlling said phototaking operation based on the result of operation by the operation means, wherein the operation means is provided, at the boundary of adjacent divided areas, with an area in which at least two parameters can be varied at the same time.

A fifth object of the present invention is to achieve control which can set plural control parameters and control the parameters according to the phototaking condition, thereby always enabling an optimum phototaking operation matching the phototaking situation and condition, and which can achieve a fast calculating speed without increase in the magnitude of calculation in the control circuit by selecting the effective parameters according to the phototaking situation.

A sixth object of the present invention is to provide an exposure control device capable of promptly responding to the change in the phototaking situation and of natural and smooth change in the phototaking mode.

A seventh object of the present invention is to provide an image pickup device which controls the phototaking operation with plural parameters, thereby achieving more delicate control than in the conventional device and enabling the phototaking operation with optimum condition only through the selection of phototaking mode under various phototaking conditions; which can reduce the magnitude of calculation and increase the speed of calculation by controlling only one of the reference parameters in each of the areas divided according to the phototaking conditions and fixing other parameters; and which determines the order of priority for plural parameters and controls only one parameter in each area of the reference parameters but simultaneously control two parameters at the transition between the areas, thereby achieving transition without unpleasant change in the image and reducing the change in the image itself that cannot be removed even with hysteresis.

Still other objects of the present invention, and the features thereof, will become fully apparent from the following description, which is to be taken in conjunction with the attached drawings.

BRIEF DESCRIPTION OF THE DRAWINGS

FIG. 4 is a view showing a light metering area in a center weighted light metering;

FIG. 6 is a view showing the mode of area division in the image frame in the present invention;

FIG. 7 is a view showing the setting and weighting of light metering area in the center weighted light metering in the present invention;

FIG. 8 is a view showing the setting and weighting of light metering area in the landscape taking mode in the present invention;

FIG. 12 is a flow chart showing the control sequence for the parameter setting shown in FIG. 11.

DESCRIPTION OF THE PREFERRED EMBODIMENTS

Now the present invention will be clarified in detail by preferred embodiments thereof shown in the attached drawing.

Figure 1:
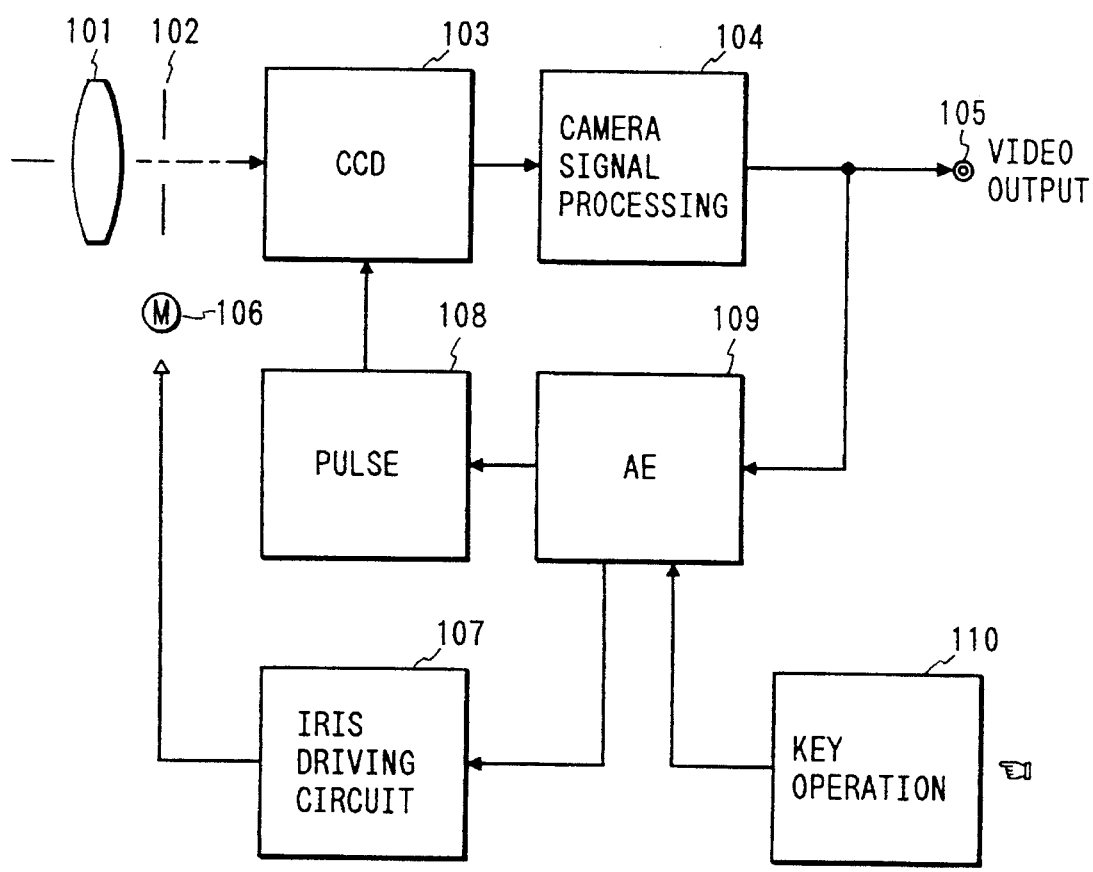
FIG. 1 is a block diagram showing configuration in which an ordinary image pickup device is applied to the exposure control device of a video camera.
Figure 2:
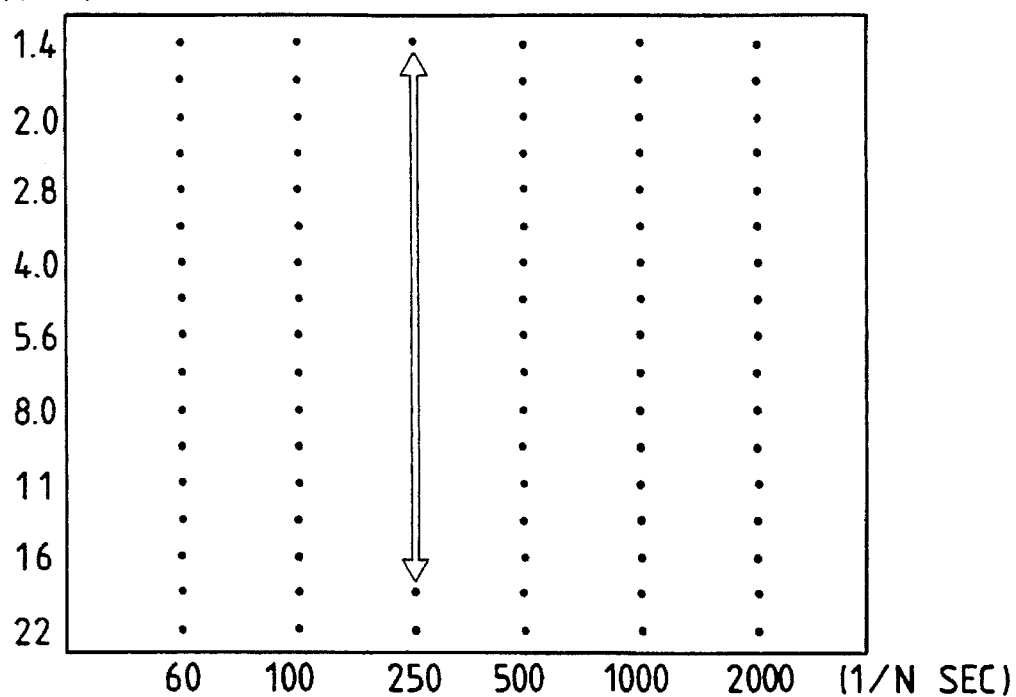
FIG. 2 is a view showing the shutter priority mode.
Figure 3:
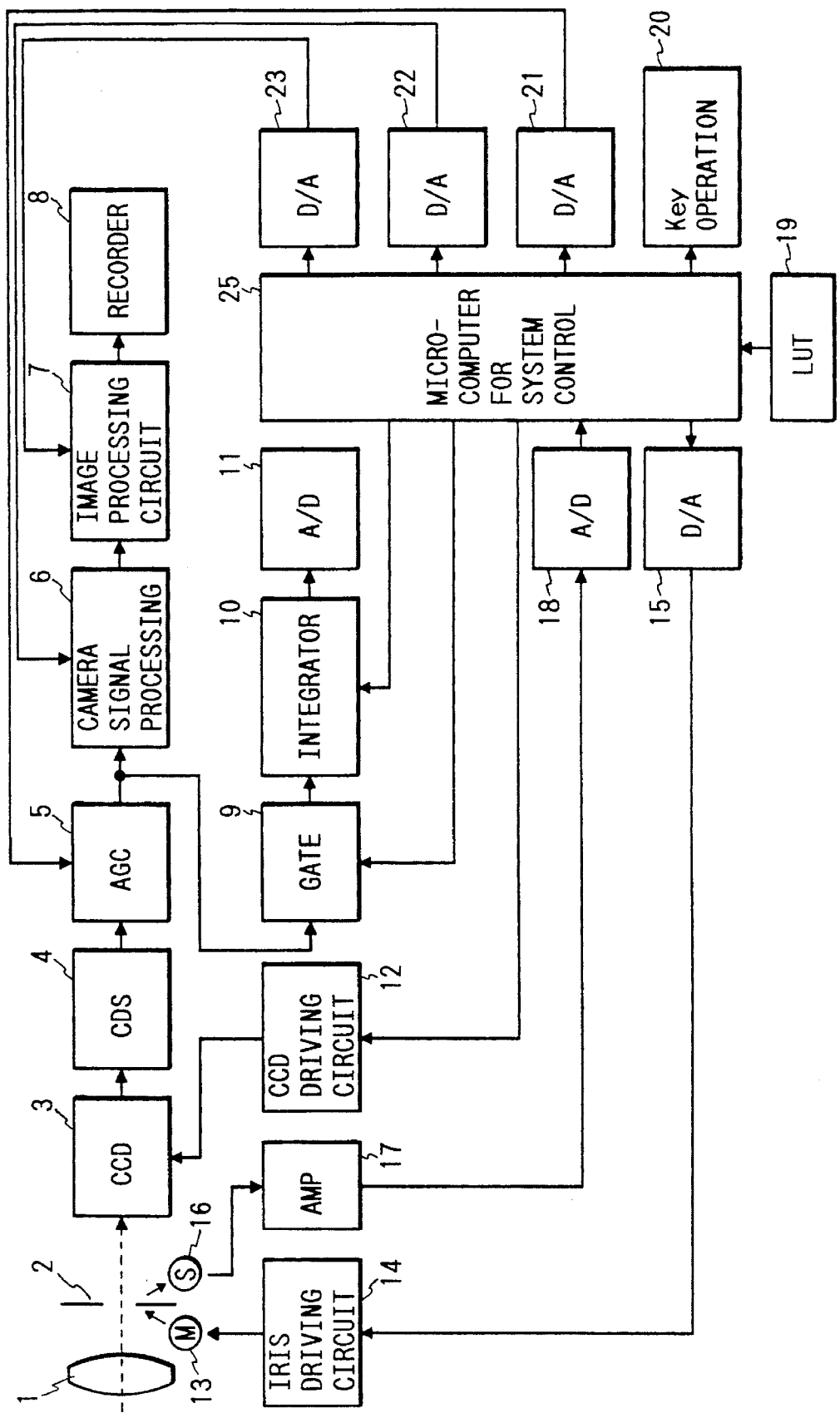
FIG. 3 is a block diagram showing configuration in which the image pickup device of the present invention is applied to the exposure control device of a video camera.

FIG. 3 is a block diagram showing the configuration of an embodiment in which the image pickup device of the present invention is applied to a video camera, wherein shown are a phototaking optical system 1; an iris 2 for regulating the amount of incident light; a photosensor device 3, such as a CCD, for effecting photoelectric conversion on an image which is focused on the light-receiving face of said photosensor device by the phototaking optical system and of which amount of light is regulated by the iris, to obtain an image signal; a circuit 4 for double correlated sampling (CDS) for reducing the noises in the accumulated changes of the photosensor device; an AGC circuit 5 for automatic gain control of the image signal; a camera signal processing circuit 6 for applying a predetermined signal processing to the image signal released from the AGC circuit 5 to obtain a standardized image signal; an image signal processing circuit 7 for converting the image signal, released from the camera signal processing circuit 6 into a signal suitable for recording on a video cassette recorder or the like; and a video cassette recorder 8 employing a magnetic tape as the recording medium.

There are also shown a gate circuit 9 for dividing the image frame into plural areas and gating the signal released from the AGC circuit 5 in order to extract the image signal corresponding to an arbitrary area; an integrator 10 for integrating the image signal, corresponding to a designated area selected by the gate circuit 9 in the image frame, thereby determining the average value of said image signal; and an A/D converter 11 for converting the signal from said integrator 10 into a digital signal that can be processed by a system control circuit to be explained later. The area designation by said gate circuit 9 and the integrating performance of the integrator 10 can be arbitrarily selected by gate pulses and integration reset pulses released from a system control circuit 25, as will be explained later.

There are further shown a CCD drive circuit 12 for controlling the accumulation, signal readout and resetting of the photosensor device 3; an iris motor 13 for driving the iris 2; an iris drive circuit 14 for driving the iris motor 13; a D/A converter 15 for converting an digital iris control signal, released from the system control circuit, into an analog signal; an iris encoder 16 composed, for example, of a Hall element, for detecting the aperture or stop value of the iris; an amplifier 17 for amplifying the output of the iris encoder 16; and an A/D converter 18 for converting the output of the iris encoder, amplified to a predetermined level by the amplifier 17, into a digital signal that can be processed by the system control circuit.

There are further provided a look-up table (LUT) 19 storing various data for iris control; an operation unit 20 including plural operation keys for effecting various operations; a D/A converter 21 for converting a digital gain control signal, released from the system control circuit, into an analog control signal for supply to the AGC circuit; and D/A converters 22, 23 for converting digital control signals, released from the system control circuit for varying or modifying the characteristics of camera signal processing and image signal processing according to the phototaking situation, into analog control signals for respective supply to the camera signal processing circuit 6 and the image signal processing circuit 7.

A system control circuit 25 is composed of a microcomputer and serves to effect overall control on the entire video camera system.

The system control circuit 25 releases, through the D/A converters 22, 23, control signals for controlling the characteristics of the camera signal processing circuit 6 and the image signal processing circuit 7 according to the phototaking mode selected by the operation unit 20, also controls the gate pulses supplied to the gate circuit 9 according to the phototaking mode, thereby setting the light metering area on the image frame, and controls the integration resetting pulses supplied to the integrator 10, thereby selecting the characteristics of the integrating operation thereof.

FIG. 4 shows an example of the setting of the light metering area in the image frame, illustrating the area setting for "center-weighted photometry" in which the photometry area is set in the central area of the image frame and the signal in said area is preferentially employed in the calculation of exposure control.

This setting is based on an empirical rule that the main object has a high probability of being positioned in the central area of the image frame, and, in the exposure operation, the inner signal inside the central area indicated by a chain line is given a larger coefficient than in the outer signal to give a larger weighting to the central area.

The system control circuit 25 fetches the integrated value, according to the phototaking mode, of the image signal of the light metering area, obtained through the gate circuit 9, then calculates an iris control signal corresponding to the phototaking situation by referring to the look-up table 19, and supplies said iris control signal to the iris drive circuit 14 through the D/A converter 15. It also supplies the gain control signal to the AGC circuit 5 through the D/A converter 21, thereby varying the gain of said AGC circuit 5 according to the phototaking mode and the phototaking situation, and sends the control signal to the CCD drive circuit 12, thereby controlling the accumulation time (electronic shutter), readout timing and reset timing of the photosensor device according to the phototaking mode and the phototaking situation.

These controls are conducted, depending on the phototaking mode, with reference to the output of the iris encoder 16, and are effected selectively or in suitable combination.

As explained above, the system control circuit 25 effects the iris control, gain control and photosensor device control (for example by control of the accumulation time) explained above at the same time or in suitable combination, according to the phototaking mode, phototaking situation and iris driving state, thereby achieving optimum exposure control in any situation.

The image pickup device of the present invention is constructed as explained above, and the detailed functions thereof will be explained in the following.

At first there will be explained various control parameters employed in the exposure control of the present invention.

(1) Iris Aperture (Parameter PI)

The iris control signal released from the system control circuit is converted into an analog signal by the D/A converter 15, then current amplified in the iris drive circuit 14, and is supplied to the iris motor 13 which in response controls the aperture of the iris 2.

If the integrated value of the integrator 10, supplied through the A/D converter 11, is larger than a control value defined by the LUT 19, the exposure is excessive so that the iris drive circuit 14 is so controlled as to drive the iris motor 13 in a direction to reduce the aperture of the iris 2, whereby the amount of incident light is decreased to lower the output level of the integrator 10.

On the other hand, if the integrated value from the A/D converter 11 is smaller than the control value defined by the LUT 19, the iris motor 13 is driven in the opposite direction to open the iris 2, whereby the amount of incident light is increased to elevate the integrated value.

Figure 5A:
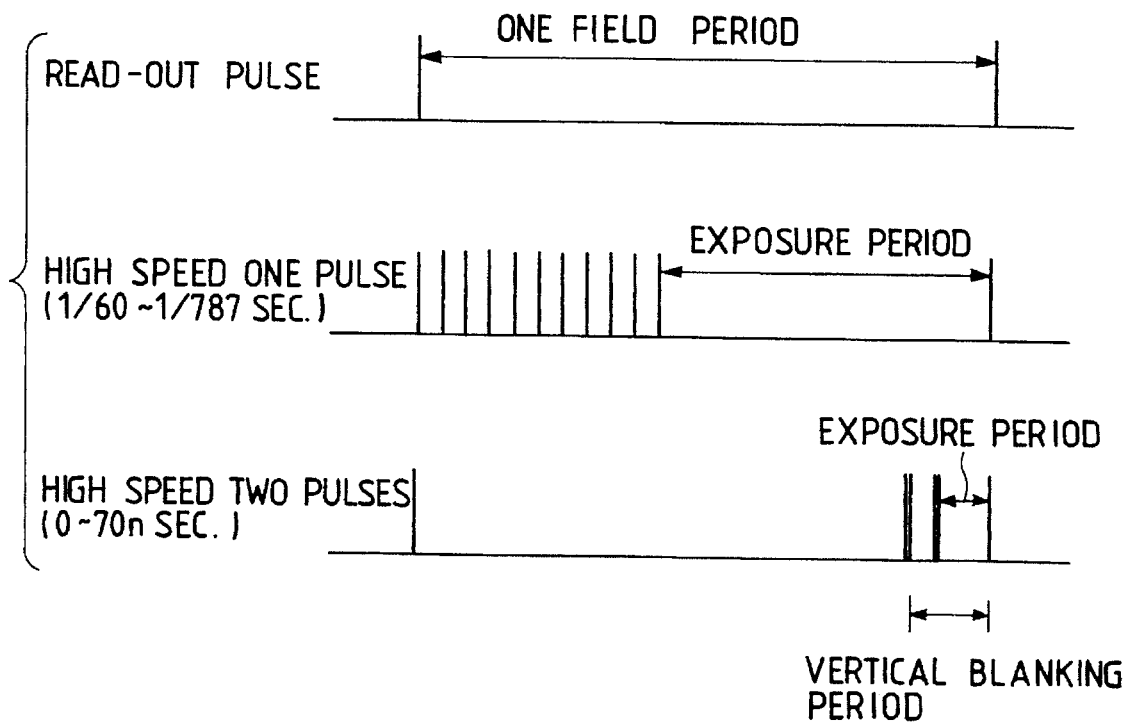
FIGS. 5A and 5B are charts showing the function of an electronic shutter.
Figure 5B:
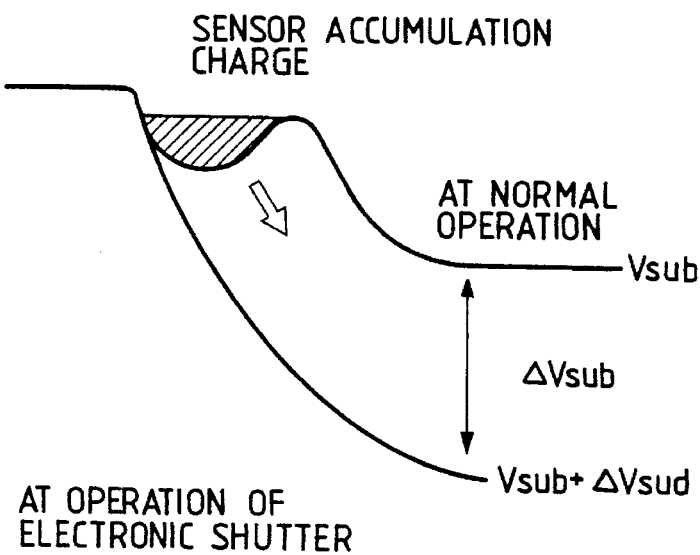

(2) Shutter Speed (Parameter 2)
(cf. FIGS. 5A and 5B)

The system control circuit 25 releases an accumulation time setting digital signal Dt, in response to which the CCD drive circuit 12 generates pulses determining the various timings of the CCD, thereby controlling the accumulation time of the photosensor device.

The method and range of setting of said accumulation time vary significantly, depending on the structure of the CCD constituting the photosensor device. In the present embodiment, there will be employed a CCD with a structure for discharging unnecessary charges in an overflow drain (OFD) in the H-blanking period.

FIGS. 5A and 5B are given for explaining the function of said CCD. The accumulation time at the high-speed side can be selected within the V-blanking period, as long as the image quality such as the phototaking light amount or the smear permits. Practically, the shortest time is about 1/10000 sec. At the low-speed side, the accumulation time can be selected, in case of NTSC standard, with a step of the H-blanking period (ca. 63.5 μsec.), down to 1/60 sec.

The shutter speed T is determined by the following calculation, based on the signal Dt released from the system control circuit 25:

$$T_{NTSC} \cong (262.5 - D_t) \times 63.5 \text{ μsec.} \qquad 1)$$

$$T_{PAL} \cong (312.5 - D_t) \times 64.0 \text{ μsec.} \qquad 2)$$

Receiving the instruction in this manner, the CCD drive circuit 12 adds a voltage $\Delta V_{sub}$ to the vertical substrate voltage $V_{sub}$, thereby varying the potential distribution in the charge accumulating portion and discharging unnecessary charge to the substrate. In this manner an arbitrary shutter speed can be attained.

If the current shutter speed is shorter than the control value defined by the LUT 19 corresponding to the integrated value from the A/D converter 11, the system control circuit 25 varies the signal Dt to a smaller value in order to prolongate the shutter time. On the other hand, if said current shutter speed is longer than said control value, the signal Dt is made larger to increase the shutter speed.

(3) Gain (Parameter P3)

The D/A converter 21 releases a gain setting signal for determining the gain for the image signal, for supply to the AGC circuit 5.

The automatic gain control is provided, by the AGC amplifier, in order that the output signal of the CDS 4 can be properly processed in the camera signal processing circuit 6. It has been regarded as a part of the automatic exposure control loop by the iris, and has not been an independently controllable factor.

However, with the recent improvement in the S/N ratio of CCD, the settable range of gain has been expanded, as the noise of the image pickup system have become less conspicuous even when the gain in AGC is selected large.

The gain is a parameter of fast response in the image pickup system, and is therefore suitable for automatic exposure control in a situation where a rapid response is required.

If the current gain of AGC is larger than the control value defined by the LUT 19 corresponding to the integrated value from the A/D converter 11, the system control circuit 25 reduces the set value of the gain for AGC. On the other hand, if the current gain is smaller than said control value, the set value of gain is renewed to a larger value.

The present invention enables to maintain the image pickup system at a proper exposure state, employing the above-mentioned three parameters, according to the phototaking situation and mode, and the exposure control relying on each of said parameters will be explained in the following. At first there will be explained the setting of light metering areas in the image frame, depending on the different exposure control modes.

The object taken by the video camera varies in different manners, depending on the location, situation and other phototaking conditions.

Therefore, in order to constantly achieve optimum automatic exposure control in such varying phototaking conditions, it is necessary to suitably vary the position of the photometry area in the image frame and the weighting of such photometry area according to the situation.

For this reason there is required an automatic phototaking mode capable of estimating the luminance distribution in the image frame in consideration of the state of illumination in the predetermined representative scene, and setting the light metering area in such a manner that a large automatic exposure calculating coefficient is assigned to an area which provides effective information for the determination of the exposure.

In the present embodiment, the image frame is divided vertically into 4 sections and horizontally into 6 sections, or, into 24 areas, which are numbered from 1 to 24 for the purpose of explanation, as shown in FIG. 6.

Such area division is controlled by the system control circuit 25. More specifically, the gate circuit 9 is opened and closed by the gate pulses released from the system control circuit 25, whereby the output of the AGC circuit 5 is extracted for each of the areas 1–24 and is independently integrated by the integrator 10 for each area. The integrated result is converted into a digital signal by the A/D converter 11 and is then fetched by the system control circuit 25.

The system control circuit 25 processes the integrated values of these areas, with the weighting coefficients predetermined corresponding to the aforementioned phototaking mode. Said processing can be conducted in time-divided manner corresponding to said 24 areas.

FIGS. 7 and 8 illustrate examples of the weighting coefficients in the image frame.

FIG. 7 shows the aforementioned "center weighted photometry" applied to the 24-area automatic exposure in the present invention, wherein the automatic exposure control with the priority in the central area is achieved by assigning a weighting coefficient of 1.0 to the central areas 8–11 and 14–17, and a weighting coefficient of 0.5 to the peripheral areas. More specifically, said weighting can be reflected in the control of the iris, shutter speed and gain, by effecting said control based on the sum of the weighted integrated values of the areas.

FIG. 8 shows an example of the photometry areas suitable for "landscape phototaking". In landscape phototaking, the ground and the sky are generally included in the image frame at the same time, and the sky is usually much higher in luminance than the ground, even in somewhat cloudy weather. For this reason, in the conventional automatic exposure control without consideration of the photometry area, a person or other object in front of the sky or the ground often appears quite dark because of underexposure.

In the present example, in order to avoid such drawback, the uppermost areas 1–6 corresponding to the sky in the image frame are practically disregarded by the assignment of a coefficient 0.0, while, in the central areas of the image frame, the upper part areas are given a coefficient of 0.5 and the lower part areas are given a coefficient of 1.0. Such assignment of the weighting coefficients enables the automatic exposure calculation with larger weight in the lower areas corresponding to the ground portion.

In addition to the two examples explained above, there may be provided other phototaking modes corresponding to various phototaking situations, and various automatic exposure characteristics can be realized by suitably selecting these modes.

In the following there will be explained the actual programmed automatic exposure control employing the above-mentioned three parameters. As explained in the foregoing, the conventional iris control is unable to cope with the various phototaking situations. For this reason, the present invention employs a larger number of parameters which are controlled in the optimum manner.

Figure 9:
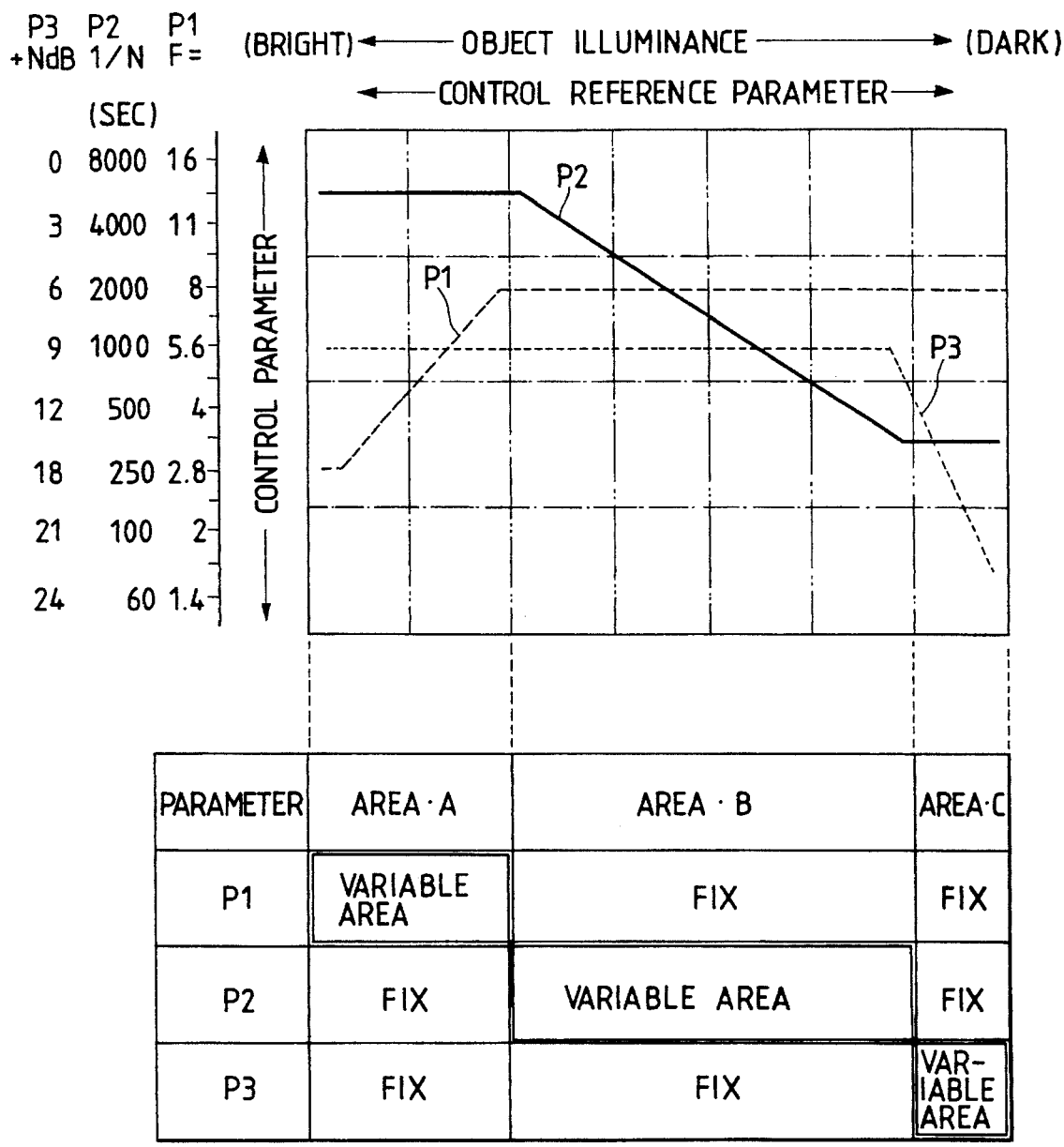
FIG. 9 is a program chart showing the parameter processing of the present invention.

FIG. 9 is a program chart showing the programmed setting of said control parameters in the automatic exposure control of the present invention.

In FIG. 9, the abscissa indicates the input parameter used as the reference for control, and the ordinate indicates the controlled parameters. Stated differently, in the present invention, plural control parameters are controlled by the value of an input parameter taken as the reference for control. The reference input parameter is, for example, the illumination intensity or luminance of the object, which becomes higher toward the left-hand end of the abscissa.

In FIG. 9, the reference parameter or the luminance is divided into plural areas (areas A, B and C in the present embodiment) according to its level on the abscissa, and in each area there is assigned a variable parameter for the automatic exposure control, as indicated in a table below the program chart.

More specifically, in FIG. 9, the input parameter is divided into areas A, B and C to which assigned respectively are the parameters P1, P2 and P3. In each area, the assigned parameter alone varies according to the input parameter, while other parameters are fixed.

In the area A of the highest luminance, the iris control parameter P1 alone is variable while other parameters are fixed. Thus the exposure is controlled by the iris aperture, and the shutter speed and the gain are fixed.

In practice, the standard shutter speed of the video camera is 1/60 sec., because the charge accumulation and readout of the photosensor device are conducted in a field period. In the area A of high luminance, the shutter speed is selected shorter than said standard speed, while the gain of AGC is fixed, and the aperture of the iris is made as large as possible in order to reduce the depth of focus to a certain extent and to improve the S/N ratio.

In the area B, the parameter P2 or the shutter speed alone is rendered variable while other parameters are fixed. In this area, therefore, the iris aperture is fixed to maintain a constant depth of focus, and the gain of AGC is not increased in order to maintain a satisfactory S/N ratio.

In the area C, the parameter P3 or the gain alone is rendered variable while other parameters are fixed. In this area, the iris aperture is fixed to cope with a situation in which the priority is to be given to the depth of focus or a situation in which the object luminance is deficient even when the iris is brought to the maximum aperture.

Such programmed control, employing a larger number of control parameters and controlling said parameters according to the value of the input parameter corresponding to a given phototaking situation, will usually require a complex calculation, for which required is a large-sized microcomputer.

In the present invention, however, the set range of the control parameters is divided into plural areas according to the value of the input parameter, and, in each of said areas, only one parameter is rendered variable while other parameters are fixed. Since the calculations for such fixed parameters can be dispensed with, the handling of complex phototaking conditions and of plural control parameters can be simplified, and the optimum automatic exposure control can be realized without the use of large-scale logics or large-sized computer.

Figure 10:
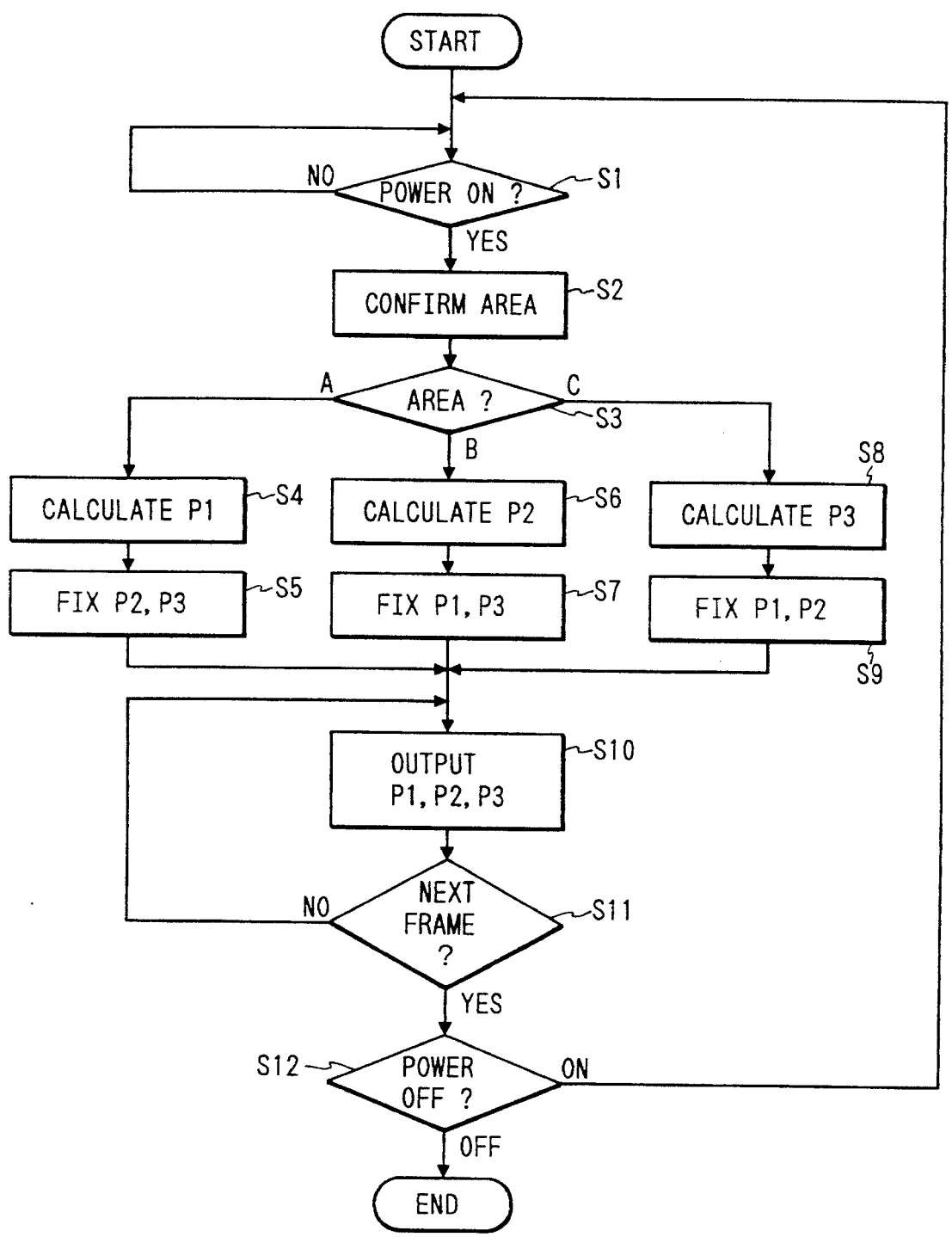
FIG. 10 is a flow chart showing the control sequence for the parameter setting shown in FIG. 9.

FIG. 10 is a flow chart showing the control sequence for the above-mentioned parameters.

When the control sequence is started, a step S1 monitors the start of power supply, and, when the power supply is started, a step S2 confirms the instructions of the operation unit, for example, for the phototaking mode, and the current area in the reference parameter shown in FIG. 9.

Then a step S3 selects a branch according to the current area, referring to the instructions for example for the phototaking mode, selected by the operation unit.

When the step S3 determines the area A, the sequence proceeds to a step S4 for calculating the iris controlling parameter P1, then a step S5 fixes other parameters P2, P3 at the previous values, and the sequence proceeds then to a step S10.

When the step S3 determines the area B, the sequence proceeds to a step S6 for calculating the shutter speed controlling parameter P2, then a step S7 fixes other parameters P1, P3 at the previous values, and the sequence proceeds then to the step S10.

When the step S3 determines the area C, the sequence proceeds to a step S8 for calculating the gain controlling parameter P3, then a step S9 fixes other parameters P1, P2 at the previous values, and the sequence proceeds then to the step S10.

The step S10 causes the system control circuit 25 to release the parameters P1, P2, P3 determined in the above-explained process, and a next step S11 waits until the next processing time unit comes (in the present embodiment, the basic unit consists of one calculation per frame). Then a step S12 discriminates whether the power supply has been turned off, and, if the power supply is continued, the sequence returns to the step S1 to repeat the above-explained process, but, if the power supply has been turned off, the sequence is terminated.

In this manner the control of various parameters is rendered possible, and the exposure control is conducted on said parameters.

As explained in the foregoing, the present invention reduces the amount of calculation by varying only one parameter and fixing other parameters, but a particular condition specific to video camera is that the object of the phototaking is a moving image of which phototaking conditions are varying constantly.

In case of determining the output parameters in response to the input parameter as explained before, the control of the system can be simplified by limiting the control to only one parameter, but the value of the input parameter may vary among plural divided areas as a result of changes in the phototaking conditions. In such case there will result a switching of the controlled parameters, but the manner of change of the image may be significantly different depending on the involved parameters, and the obtained image will become uncomfortable if such switching occurs frequently.

As a countermeasure for such drawback, it is conceivable to create hysteresis in the transition between the areas, thereby reducing the frequency of transitions between the areas, but such method cannot be a basic solution as it is effectless once the switching has taken place.

Figure 11:
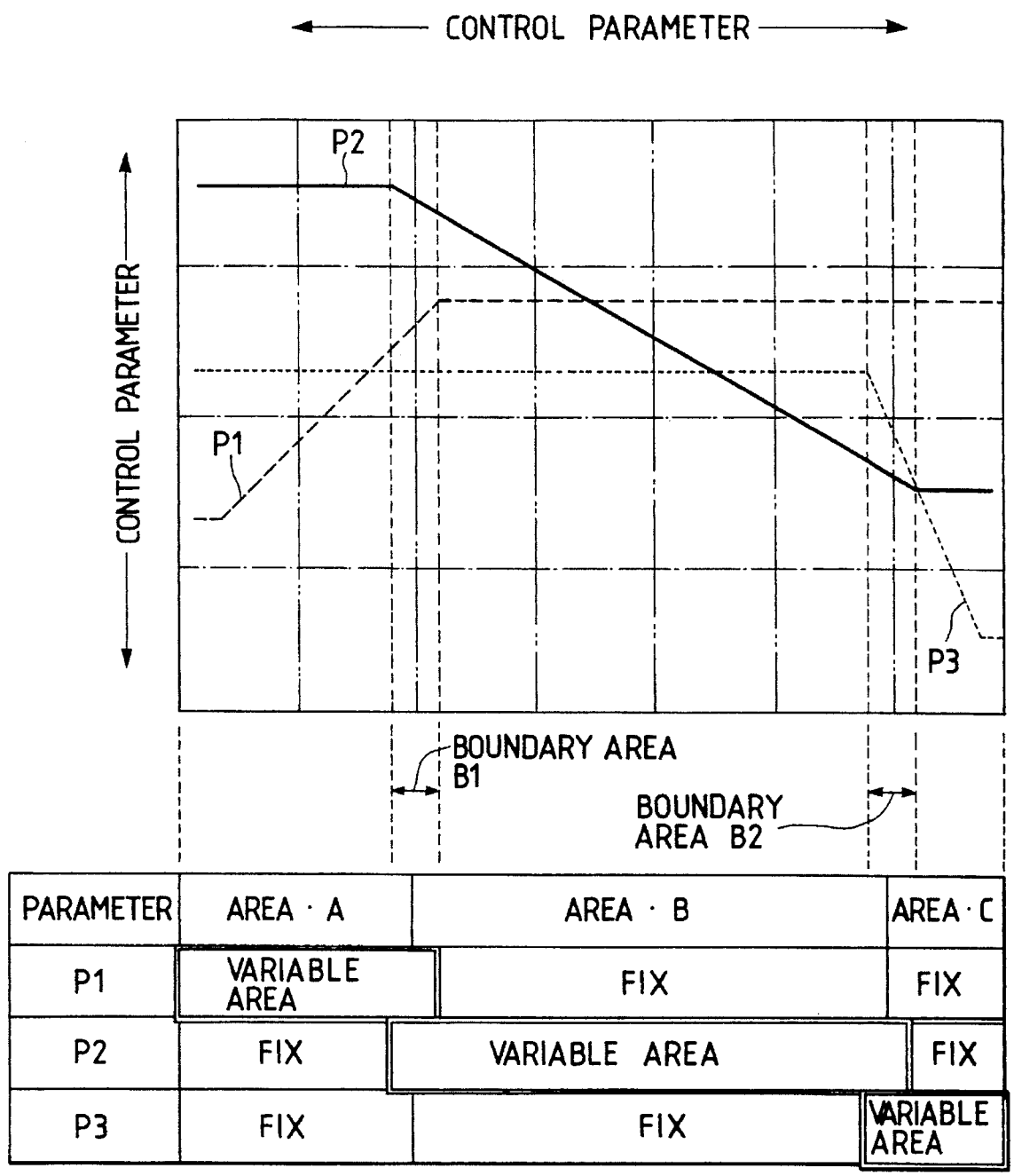
FIG. 11 is a program chart showing another example of the parameter processing of the present invention.

In the present invention, as the countermeasure, two parameters of the adjacent areas are simultaneously varied in the vicinity of the boundary of said areas, as shown in FIG. 11.

In FIG. 11, the parameters P1 and P2 are varied simultaneously in a boundary region B1 defined by broken lines, and the parameters P2 and P3 are varied simultaneously in a boundary region B2.

Such simultaneous change of two parameters causes the image changes specific to these parameters in simultaneous and gradual manner, so that the change in the image becomes visually natural even in case the transition of parameters occurs between the different areas.

FIG. 12 is a flow chart showing the parameter setting sequence, including the above-mentioned parameter processing at the boundary portion of the areas.

When the control sequence is started, a step S101 monitors the start of power supply, and when the power supply is started, a step S102 confirms the instructions of the operation unit, for example, for the phototaking mode, and the current area in the reference parameter shown in FIG. 11.

Then a step S103 selects a branch according to the current area, also referring to the instructions for example for the phototaking mode, selected by the operation unit.

When the step S103 determines the area A, the sequence proceeds to a step S104 for calculating the parameter P1, then a step S105 discriminates whether the current position is inside the boundary region B1, and, if outside the boundary region B1, the sequence proceeds to a step S106 for fixing the parameter P2 at the previous value, but, if inside the boundary region B1, the sequence proceeds to a step S107 for calculating the parameter P2 anew. Then a step S117 fixed the parameter P3 at the previous value.

When the step S103 determines the area B, a step S108 calculates the parameter P2, then a step S109 discriminates whether the current position is inside the boundary region B1 or B2. If inside the boundary region B1, a step S110 calculated the parameter P1, then a step S117 fixed the parameter P3 at the previous value, and the sequence proceeds to a step S120.

If inside the boundary region B2, a step S112 calculates the parameter P3, and a step S119 fixed the parameter P1 at the previous value.

If the current position does not belong to either the boundary region B1 or B2, a step S111 fixed the parameter P1 at the previous value, then a step S118 fixed the parameter P3, and the sequence proceeds to the step S120.

When the step S103 determines the area C, a step S113 calculates the parameter P3, then a step S114 discriminates whether the current position is inside the boundary region B2, and, if outside the boundary region B2, a step S116 fixed the parameter P2 at the previous value, but, if inside the boundary region B2, a step S115 calculates the parameter P2 anew. Subsequently the sequence proceeds to a step S119 for fixing the parameter P1 at the previous value, and then proceeds to a step S120.

The step S120 causes the system control circuit 25 to release the parameters P1, P2, P3 determined in the above-explained process, and a next step S121 waits until the next processing time comes (in the present embodiment, the basic unit consists of one calculation per frame). Then a step S122 discriminates whether the power supply has been turned off, and, if the power supply is continued, the sequence returns to the step S101 to repeat the above-explained process, but, if the power supply has been turned off, the sequence is terminated.

In this manner the control of various parameters is rendered possible, and the exposure control is conducted on said parameters. Besides, even when the phototaking situation varies, the control mode can be shifted in optimum manner without unnatural change in the image pickup state of the camera.

As explained in the foregoing, the image pickup device of the present invention, controlling the phototaking state by means of plural parameters, is capable of more delicate control than in the conventional devices, and enables optimum phototaking operation through the selection of the phototaking mode only.

Also the calculation for exposure control can be reduced in magnitude and made faster, since only one control parameter is rendered variable while other control parameters are fixed in each of the areas of a reference parameter, divided according to the phototaking conditions.

Furthermore the order of priority is defined for the plural control parameters, and, though only one parameter is controlled in each area of the reference parameter, two parameters of the adjacent two areas can be simultaneously controlled at the transition between said two areas, whereby the switching of the parameters can be achieved without unnatural change in the image. It is therefore rendered possible to reduce the change of the image itself, which could not be avoided even with the conventional hysteresis method.

What is claimed is:

1. An image pickup device capable of controlling an image pickup operation with plural control parameters, comprising:

a) means for dividing the control range of each of said plural control parameters into plural ranges in which the corresponding control parameters is varied or fixed, plural-ranges of said plural control parameters being divided in different manners respectively so that a position of a boundary of said plural ranges is different with respect to the each individual control parameters; and b) control means for controlling said image pickup operation, based on the control parameters in the divided ranges corresponding to each other.

2. An image pickup device according to claim 1, wherein said control parameters are at least two of iris aperture, shutter speed and gain of a gain control means.

3. An image pickup device according to claim 2, wherein the divided ranges of said control parameters are determined by the value of an input parameter.

4. An image pickup device according to claim 3, wherein said input parameter is the luminance signal level.

5. An image pickup device according to claim 2, further comprising:

memory means for storing the setting of said plural parameters for each of plural phototaking modes; and mode setting means for reading the set values of the control parameters, from said memory means, corresponding to each of said plural phototaking modes.

6. An image pickup device according to claim 5, wherein said mode setting means includes means for manually setting plural phototaking modes.

7. An image pickup device according to claim 5, wherein said control parameters vary through intermediate values between said divided areas.

8. An image pickup device capable of controlling an image pickup operation with plural control parameters, comprising:

for dividing the control range of each of said plural control parameters into plural ranges in which the corresponding control parameters is varied or fixed, said plural ranges of said plural control parameters being divided in different manners respectively so that a position of a boundary of said plural ranges is different with respect to the each individual control parameter;

control means for controlling said image pickup operation, based on the control parameters in the divided ranges corresponding to each other; and means for varying at least two parameters at the same time in a predetermined area adjacent to the boundary of said divided ranges of each of said at least two parameters.

9. An image pickup device according to claim 8, wherein said control parameters are iris aperture, shutter speed and gain.

10. An image pickup device according to claim 9, wherein said divided ranges are defined according to the luminance signal level.

11. An image pickup device according to claim 8, further comprising:

setting means for setting said control parameters in each of plural phototaking modes.

12. An image pickup device according to claim 11, wherein said setting means includes memory means for storing the set values of the control parameters in each of plural phototaking modes.

13. An image pickup device according to claim 12, wherein said operation means is composed of a microcomputer.

14. An image pickup device according to claim 12, wherein said operation means is adapted to vary the variable control parameter according to the phototaking mode and to said divided ranges.

15. A method for controlling an image pickup device capable of controlling an image pickup operation with plural control parameters, comprising steps of:

dividing the control range of said plural control parameters into plural ranges;

setting control parameters being varied or fixed in each of said divided ranges, said plural ranges of said plural control parameters being divided in different manners respectively so that a position of a boundary of said plural ranges is different with respect to the each individual control parameter; and controlling said image pickup operation, based on the control parameters in the divided ranges corresponding to each other.

16. A method according to claim 15, wherein said plural control parameters include an iris value, a shutter speed and gain.

17. A method according to claim 16, wherein the control range of the control parameter is divided according to brightness information.

18. A method according to claim 17, wherein in said boundary of the ranges, the plural control parameters are varied at the same time and one of the plural control parameters is fixed.

* * * * *

UNITED STATES PATENT AND TRADEMARK OFFICE
CERTIFICATE OF CORRECTION

PATENT NO. : 5,621,462
DATED : April 15, 1997
INVENTOR(S) : Takahashi et al.

It is certified that error appears in the above-identified patent and that said Letters Patent is hereby corrected as shown below:

Col. 12, line 28, before "for dividing" insert -- means --.

Signed and Sealed this

Twenty-sixth Day of May, 1998

Attest:

BRUCE LEHMAN

Attesting Officer     Commissioner of Patents and Trademarks

UNITED STATES PATENT AND TRADEMARK OFFICE
CERTIFICATE OF CORRECTION

PATENT NO. : 5,621,462

DATED : April 15, 1997

INVENTOR(S) : Koji Takahashi, et. al.

It is certified that error appears in the above-identified patent and that said Letters Patent is hereby corrected as shown below:

Title page, item [54] and col. 1, line 2, delete "MADE" and insert – IMAGE--.

Signed and Sealed this

Eighth Day of September, 1998

Attest:

BRUCE LEHMAN

*Attesting Officer*     *Commissioner of Patents and Trademarks*